United States Patent
Gloge

[15] 3,653,738
[45] Apr. 4, 1972

[54] OPTICAL WAVEGUIDE WITH UNEQUALLY SPACED LENSES

[72] Inventor: Detlef Christoph Gloge, Red Bank, N.J.
[73] Assignee: Bell Telephone Laboratories, Incorporated, Murray Hill, N.J.
[22] Filed: June 29, 1970
[21] Appl. No.: 50,569

[52] U.S. Cl............................................350/96 WG, 350/294
[51] Int. Cl...................................G02b 27/00, H01p 3/00
[58] Field of Search.......................................350/96 WG, 294

[56] References Cited

UNITED STATES PATENTS

| | | |
|---|---|---|
| 3,224,330 | 12/1965 | Kompfner........................350/294 UX |
| 3,382,022 | 5/1968 | Fox..................................350/96 WG X |
| 3,410,623 | 11/1968 | Kogelnik..........................350/96 WG |
| 3,466,111 | 9/1969 | Ring................................350/96 WG UX |
| 3,492,485 | 1/1970 | Marcatili........................350/96 WG X |

*Primary Examiner*—John K. Corbin
*Attorney*—R. J. Guenther and Arthur J. Torsiglieri

[57] ABSTRACT

A beam waveguide for guiding optical wave energy over extended distances by means of lenses of variable spacing whose focal lengths are a function of the separation from adjacent lenses and the maximum lens-to-lens spacing in the system.

5 Claims, 3 Drawing Figures

PATENTED APR 4 1972  3,653,738

INVENTOR
D. C. GLOGE
BY
Sylvan Sherman
ATTORNEY

OPTICAL WAVEGUIDE WITH UNEQUALLY SPACED LENSES

This invention relates to beam waveguides having arbitrarily spaced focusing members.

BACKGROUND OF THE INVENTION

The invention of the laser has served to revive interest in light as a communication carrier. However, before a light communication system can become economically and technically feasible, the problems of guided propagation of light over extended distances must be solved. To this end, a variety of beam waveguides have been proposed. See, for example, U.S. Pat. Nos. 3,442,574; 3,403,956; and 3,457,001.

For the sake of system simplicity and lowest cost, it would be highly desirable to construct a beam waveguide using equally spaced focusing members (lenses) of the same kind. However, topographic and other right-of-way obstructions may make this impossible.

It is, accordingly, the broad object of the present invention to guide optical wave energy over extended distances by means of arbitrarily spaced focusing members.

SUMMARY OF THE INVENTION

In accordance with the present invention, beam guidance is achieved by means of a plurality of arbitrarily spaced lenses whose focal lengths are a function of the distances between adjacent lenses and the maximum lens-to-lens spacing in the system. In a waveguide so proportioned, a coherent Gaussian beam propagating therealong will have the same beam diameter at each of the arbitrarily spaced lenses.

It is, thus, an advantage of the invention that all, or portions, of a long distance beam waveguide can be efficiently designed to accommodate limitations imposed by the terrain through which the waveguide must pass.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
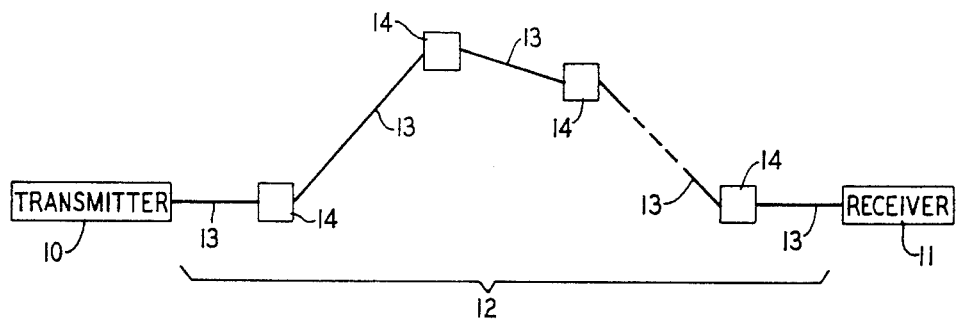
FIG. 1 shows, in block diagram, a typical beam transmission system.

Referring to the drawings, FIG. 1, included for purposes of explanation, shows an optical transmission system comprising a transmitter 10, a receiver 11 and a guiding wavepath 12 connecting the transmitter to the receiver. In the communication system contemplated by the invention, the distance between the transmitter and receiver is long, typically of the order of many miles and, hence, there will generally be many changes in direction in order to conform to the available right-of-ways, terrain undulations, and to avoid natural obstructions. Thus wavepath 12 is shown to include a plurality of straight sections of waveguide 13, arranged at varying orientations, and a plurality of beam deflectors and refocusers 14 for refocusing and redirecting the optical beam from along one of said straight sections of waveguide to along the next adjacent straight section of waveguide.

The general requirements of an optical beam waveguide have been fully described in the literature. See, for example, "Effect of Redirectors, Refocusers, and Mode Filters on Light Transmission Through Aberrated and Misaligned Lenses," by E. A. J. Marcatili, published in the Oct. 1967 issue of the Bell System Technical Journal, pp. 1733–1752.

Figure 2:
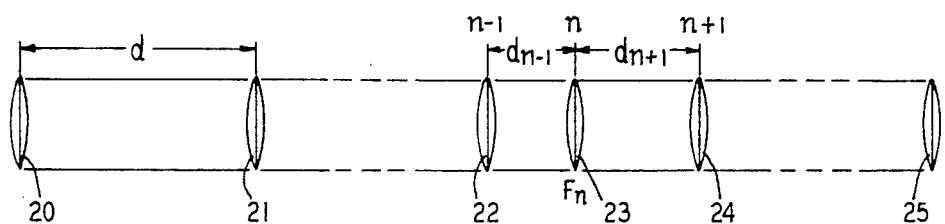
FIG. 2 shows a beam waveguide of arbitrarily spaced focusing members, in accordance with the invention.

For the sake of simplicity and cost reduction it would be most advantageous if the focusing members comprising the beam waveguide are all the same. That is, all of the lenses (or focusing mirrors), are the same size and have the same focal length. This would require, however, that the lens-to-lens spacings be equal throughout the system. In terms of the wavepath shown in FIG. 1, this would require either that waveguide sections 13 be equal in length or that they differ by integral multiples of the lens-to-lens spacing. Unfortunately, this is not always possible. In the most general case, the lens-to-lens spacings will have to be varied in order to conform the wavepath to the terrain. Such a variation, however, would cause the beam to increase in size and, ultimately, to exceed the guide diameter unless the focal lengths of the individual lenses are adapted to the variations in the lens-to-lens spacings. Such a portion of waveguide is illustrated in FIG. 2, which comprises a plurality of arbitrarily spaced lenses 20, 21, 22, 23, 24, and 25. Designating lens 23 as the $n^{th}$ lens in the waveguide, adjacent lenses 22 and 24 are then the $(n-1)^{th}$ and the $(n+1)^{th}$ lens, respectively. The lens-to-lens spacing between lenses 22 and 23 is given as $d_{n-1}$, while the lens-to-lens spacing between lenses 23 and 24 is given as $d_{n+1}$. Also given as the distance between lenses 20 and 21 is the maximum lens-to-lens spacing $d$ for the portion of waveguide illustrated.

In accordance with the present invention, the focal length $F_n$ of the $n^{th}$ lens in the waveguide is given as $$F_n = \left[ \frac{d_{n+1}}{d^2} \left( 1 \pm \sqrt{1 - \left(\frac{d_{n+1}}{d}\right)^2} \right)^{-1} + \frac{d_{n-1}}{d^2} \left( 1 \pm \sqrt{1 - \left(\frac{d_{n-1}}{d}\right)^2} \right)^{-1} \right]^{-1} \quad (1)$$

It will be noted that there are two permissible focal lengths, corresponding to the two values of $F_n$ obtained by selecting either the (+) or (−) signs in equation (1). However, the larger value obtained by selecting the (+) sign is preferred as the effects of lens aberrations tend to decrease with increasing focal lengths. In either case, however, a coherent Gaussian beam, propagating along such a waveguide will maintain a constant $1/e$ radius of $d\lambda/\pi$ at each lens, where $\lambda$ is the free space wavelength of the beam.

Figure 3:
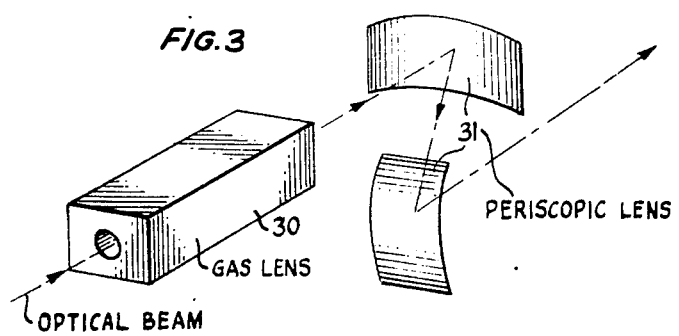
FIG. 3 shows a portion of a beam waveguide employing gas and periscopic lenses.

While the focusing members have been referred to and illustrated as dielectric lenses, it will be recognized that, alternatively, other focusing means such as gas lenses, pairs of periscopically aligned mirrors, as disclosed in the copending application Ser. No. 887,262, filed Dec. 22, 1969, and assigned to applicant's assignee, or combinations thereof, as illustrated in FIG. 3, can be used. As shown in this figure, a gas lens 30 is combined with a periscopic lens 31. Thus, in all cases, it is understood that the above-described arrangement is illustrative of but one of the many possible specific embodiments which can represent applications of the principles of the invention. Numerous and varied other arrangements can readily be devised in accordance with these principles by those skilled in the art without departing from the spirit and scope of the invention.

I claim:

1. A beam waveguide comprising:
   a plurality of spaced focusing members characterized in that:
   the spacings between at least one pair of said members is different than the spacing between another pair of said members;
   and in that the focal length of said members are selected to maintain the same beam diameter at each of said members;
   said focal lengths being given by $$F_n = \left[ \frac{d_{n+1}}{d^2} \left( 1 \pm \sqrt{1 - \left(\frac{d_{n+1}}{d}\right)^2} \right)^{-1} + \frac{d_{n-1}}{d^2} \left( 1 \pm \sqrt{1 - \left(\frac{d_{n-1}}{d}\right)^2} \right)^{-1} \right]^{-1};$$

where $d_{n+1}$ and $d_{n-1}$ are the member-to-member spacings between the $n^{th}$ focusing member and the two adjacent focusing members, and $d$ is the maximum member-to-member spacing along said waveguide.

2. The waveguide according to claim 1 wherein said focusing members are gas lenses.

3. The waveguide according to claim 1 wherein said focusing members are dielectric lenses.

4. The waveguide according to claim 1 wherein said focusing members are pairs of periscopically aligned mirrors.

5. The waveguide according to claim 1 wherein said focusing members comprise combinations of lenses and periscopically aligned mirrors.

* * * * *